United States Patent [19]

Sugimoto et al.

[11] Patent Number: 5,576,080
[45] Date of Patent: Nov. 19, 1996

[54] POLYETHYLENIC FOAMING COMPOSITIONS AND MOLDED FOAMS

[75] Inventors: Hiroyuki Sugimoto, Osaka; Toshio Igarashi, Kyoto; Yoshihiro Nakatsuji, Osaka; Masayuki Tatsumi, Tokyo; Kenzou Chikanari, Chiba; Satoru Funakoshi, Osaka, all of Japan

[73] Assignee: Sumitomo Chemical Company, Limited, Osaka, Japan

[21] Appl. No.: 609,913

[22] Filed: Feb. 29, 1996

Related U.S. Application Data

[62] Division of Ser. No. 359,289, Dec. 19, 1994.

[30] Foreign Application Priority Data

| Dec. 20, 1993 | [JP] | Japan | 5-319594 |
| Sep. 27, 1994 | [JP] | Japan | 6-231181 |
| Oct. 14, 1994 | [JP] | Japan | 6-249299 |

[51] Int. Cl.$^6$ .............. B29D 22/00; B32B 7/12; B32B 5/18
[52] U.S. Cl. .............. 428/36.5; 156/78; 156/79; 428/317.5; 428/319.3; 428/319.9
[58] Field of Search ............. 428/36.5, 317.5, 428/319.3, 319.9; 156/78, 79

[56] References Cited

U.S. PATENT DOCUMENTS

| 4,554,293 | 11/1985 | Park . |
| 4,581,383 | 4/1986 | Park . |

FOREIGN PATENT DOCUMENTS

| 247580 | 12/1987 | European Pat. Off. . |
| 331447 | 9/1989 | European Pat. Off. . |
| 4661179 | 1/1992 | European Pat. Off. . |
| 515223 | 11/1992 | European Pat. Off. . |
| 49-002867 | 1/1974 | Japan . |
| 62-199630 | 9/1987 | Japan . |
| 63-086719 | 4/1988 | Japan . |
| 4345637 | 12/1992 | Japan . |
| 05000473 | 1/1993 | Japan . |
| 05228947 | 8/1993 | Japan . |
| 05208467 | 8/1993 | Japan . |

*Primary Examiner*—Morton Foelak
*Attorney, Agent, or Firm*—Birch, Stewart, Kolasch & Birch, LLP

[57] ABSTRACT

The present invention provides a polyethylenic foaming composition comprising (a) 100 parts by weight of an ethylenic copolymer having glycidyl groups consisting of 20 to 99.9% by weight of ethylene units, 0.1 to 30% by weight of a unit of a glycidyl ester of an unsaturated carboxylic acid or an unsaturated glycidyl ether, and 0 to 50% by weight of ethylenically unsaturated ester units other than a glycidyl ester, (b) 0.1 to 30 parts by weight of a carboxylic acid having 2 or more carboxyl groups and a molecular weight of 1500 or less, and (c) 0.1 to 20 parts by weight of a foaming agent of a thermal decomposition type. The present invention also provides a polyethylenic foam molded from said foaming composition. In addition, the present invention provides a molded composite foam having a foam layer molded from a powder of said foaming composition and a non-foam layer molded from a composition powder containing a certain thermoplastic elastomer, as well as a multilayer molded article containing said molded composite foam.

According to the present inventive polyethylenic foaming composition, a foam having excellent lightness in weight, excellent cleanness, uniformly foamed cells, high expansion ratio, and excellent impact resilience can be obtained.

4 Claims, 5 Drawing Sheets

POLYETHYLENIC FOAMING COMPOSITIONS AND MOLDED FOAMS

This application is a divisional of copending application Ser. No. 08/359,289, filed on Dec. 19, 1994, the entire contents of which are hereby incorporated by reference.

BACKGROUND OF THE INVENTION

1. Field of the Invention

The present invention relates to a polyethylenic foaming composition and a method of preparing the same, a polyethylene foam obtained from said polyethylenic foaming composition and a method of preparing the same, a molded composite foam comprising a foam layer obtained from a powder of said polyethylenic foaming composition and a non-foam layer obtained from a powder of a composition containing a certain thermoplastic elastomer and a method of preparing the same, a multilayer molded article consisting of a composite foam layer as said molded composite foam and a thermoplastic resin layer and a method of preparing the same, and a multilayer molded article consisting of a composite foam layer as said molded composite foam and a thermosetting resin layer and a method of preparing the same.

2. Related Art and Objective of the Invention

Synthetic resin foams are useful as materials for shock absorbers, heat insulators, packages and the like, and it is also known that such foams are produced by subjecting a vinyl chloride-based foaming composition powder to a powder molding process.

However, a foam obtained from a vinyl chloride-based foaming composition powder not only has poor lightness in weight, but also poor cleanness due to the emission of acidic substances upon burning as a waste, causing air pollution and acid rain.

We had already proposed that such problems could be overcome by replacing the vinyl chloride-based foaming composition powder with a polyolefinic foaming composition powder consisting of a thermoplastic elastomer as a partially crosslinked composition obtained from an ethylene/α-olefinic copolymeric rubber and a polyolefinic resin and a foaming agent of a thermal decomposition type for the purpose of obtaining a polyolefinic foam (JPA 345637-1992).

Nevertheless, such foam is not always satisfactory due to poor impact resilience, although it has a high expansion ratio and uniformly foamed cells.

On the other hand, an attempt was made to prepare a polyethylenic foam by press molding, extrusion molding, calender molding, and the like, using a foaming composition consisting of an ethylenic copolymer having functional groups such as carboxylic groups and carboxylic anhydride groups, an ethylenic copolymer having glycidyl groups, and a foaming agent of a thermal decomposition type (JPA 199630-1987).

However, a foam obtained by such methods suffers from the problems of a poor expansion ratio and poor impact resilience.

We expended much effort to obtain a synthetic resin foam having excellent lightness in weight, excellent cleanness, a high expansion ratio, and excellent impact resilience, and surprisingly found that by molding a particular foaming composition consisting of an ethylenic copolymer having glycidyl groups, a carboxylic acid having two or more carboxyl groups and a molecular weight of 1500 or less, and a foaming agent of a thermal decomposition type, a foam having a high expansion ratio and excellent impact resilience can be obtained. Then after further studies, we established the present invention.

On the other hand, a molded composite foam comprising a non-foam layer having a complex surface pattern such as a leather grain pattern and a stitch pattern and a foam layer has conventionally been employed as a skin for the interior of automobiles, and it is also known that such skin is made by subjecting a vinyl chloride-type non-foaming composition powder to a powder molding process to form a non-foam layer followed by molding a vinyl chloride-based foaming composition powder into a foam layer as a liner of the non-foam layer.

However, such molded composite foam obtained from a vinyl chloride-based resin not only has poor lightness in weight, but also poor cleanness, and thus is not satisfactory.

As a molded composite foam capable of overcoming such problems, we had already proposed a molded composite foam having a non-foam layer molded from a composition powder containing a thermoplastic elastomer which is a composition comprising an ethylene/α-olefinic copolymeric rubber and a polyolefinic resin or a thermoplastic elastomer which is a partially crosslinked composition comprising an ethylene/α-olefinic copolymeric rubber and a polyolefinic resin, and a foam layer molded from a foaming composition powder containing the thermoplastic elastomer mentioned above and a foaming agent of a thermal decomposition type (JPA-473-1993, 228947-1993 and 208467-1993).

Nevertheless, such molded composite foam has impact resilience which is not sufficient and which is not satisfactory, although it has excellent lightness in weight and excellent cleanness as well as a high expansion ratio of the foam layer.

We then made much effort to obtain a molded composite foam further having excellent impact resilience, and we surprisingly found that by using a particular foaming composition powder mentioned above consisting of an ethylenic copolymer having glycidyl groups, a carboxylic acid having two or more carboxyl groups and a molecular weight of 1500 or less, and a foaming agent of a thermal decomposition type as a foaming composition powder in the powder molding method, a molded composite having excellent impact resilience as well as a high expansion ratio can be obtained. Then after further studies, we established the present invention.

Accordingly, the present invention provides a polyethylenic foaming composition comprising (a) 100 parts by weight of an ethylenic copolymer having glycidyl groups consisting of 20 to 99.9% by weight of ethylene units, 0.1 to 30% by weight of the unit of a glycidyl ester of an unsaturated carboxylic acid or an unsaturated glycidyl ether, and 0 to 50% by weight of an ethylenic ester unit other than a glycidyl ester, (b) 0.1 to 30 parts by weight of a carboxylic acid having 2 or more carboxyl groups and a molecular weight of 1500 or less, and (c) 0.1 to 20 parts by weight of a foaming agent of a thermal decomposition type, and a method of preparing the same, as well as a polyethylenic foam molded from said polyethylenic foaming composition, and a method of preparing the same.

The present invention also provides a molded composite foam having excellent impact resilience, consisting of a foam layer obtained from the powder of said polyethylenic foaming composition (A) and a non-foam layer obtained from the powder of a composition containing a thermoplastic elastomer (B) described below, as well as a multilayer molded article having such molded composition foam and a method of preparing the same.

(B) is a thermoplastic elastomer having a complex dynamic viscosity η*(1) of $1.5 \times 10^5$ poise or less and a Newtonian viscosity index n of 0.67 or less, which is a composition consisting of an ethylene/α-olefinic copolymeric rubber and a polyolefinic resin or a partially-crosslinked composition consisting of an ethylene/α-olefinic copolymeric rubber and a polyolefinic resin.

DETAILED DESCRIPTION OF THE INVENTION

The present invention is described in detail below.

The ethylenic copolymer (a) which is a component of the present inventive polyethylenic foaming composition employs an ethylenic copolymer having glycidyl groups consisting of 20 to 99.9% by weight of ethylene units, 0.1 to 30% by weight of the unit of a glycidyl ester of an unsaturated carboxylic acid or an unsaturated glycidyl ether, and 0 to 50% by weight of an ethylenically unsaturated unit other than a glycidyl ester.

As a unit of a glycidyl ester of an unsaturated carboxylic acid or an unsaturated glycidyl ether, a unit derived from a compound of the general formula:

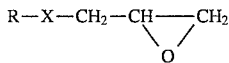

wherein R represents an alkenyl group having 2 to 18 carbon atoms, X represents a carbonyloxy group, a methyleneoxy group, or a phenyleneoxy group, can be used.

Examples of such compounds include glycidyl acrylate, glycidyl methacrylate, glycidyl itaconate, allyl glycidyl ether, methallyl glycidyl ether, styrene-p-glycidyl ether, and the like.

The ethylenic copolymer contains the unit of a glycidyl ester of an unsaturated carboxylic acid or the unit of an unsaturated glycidyl ether generally in an amount from 0.1 to 30% by weight, preferably from 0.5 to 20% by weight.

As an ethylenically unsaturated ester unit other than a glycidyl ester, a unit derived from vinyl esters such as vinyl acetate and vinyl propionate, and from esters of α, β-unsaturated carboxylic acids such as methyl acrylate, ethyl acrylate, butyl acrylate, methyl methacrylate, ethyl methacrylate, and butyl methacrylate can be used. The units derived from vinyl acetate, methyl acrylate, and ethyl acrylate are preferred.

Although an ethylenically unsaturated ester unit other than a glycidyl ester is not necessarily contained in an ethylenic copolymer, it may be contained in an amount of 50% by weight or less. An amount exceeding 50% by weight not only causes reduced thermal resistance of a molded article, but also significantly affects powder fluidability, resulting in difficulty in powder molding processes. Thus, a content of 50% by weight is practical when such an ethylenically unsaturated ester unit is contained.

The ethylenic copolymer (a) contains the monomer unit mentioned above, and can be produced, for example, by copolymerizing a starting monomer in the presence of a radical initiator under a pressure from 500 to 4000 atm and at a temperature from 100° to 300° C. in the presence or absence of a solvent or chain transfer agent. Alternatively, it may be produced by subjecting a mixture consisting of polyethylene, an unsaturated compound having glycidyl groups, and a radical initiator to melt graft polymerization using, for example, an extruder.

An ethylenic copolymer (a) having a melt flow rate (MFR, according to JIS K6730) of 5 g/10 minutes or higher is generally employed since a rate less than 5 g/10 minutes tends to reduce the expansion ratio. It is preferable to use an ethylenic copolymer (a) having an MFR of 10 g/10 minute or more.

The carboxylic acid (b) employed in the present invention has two or more carboxylic groups and a molecular weight of 1500 or less, preferably 1000 or less. It may be in the form of a solid or a liquid.

Examples are oxalic acid, maleic acid, malonic acid, phthalic acid, fumaric acid, succinic acid and derivatives thereof such as 2,3-dimethyl succinic acid, 2-ethyl-2-methyl succinic acid, 2-phenyl succinic acid, and 2-hydroxy succinic acid; glutaric acid and derivatives thereof such as 3-methyl glutaric acid, 2,4-dimethyl glutaric acid, and 3,3-dimethyl glutaric acid; adipic acid and derivatives thereof such as 3-methyl adipic acid; sebacic acid; 1,4-cyclohexane carboxylic acid; phthalic acid derivatives such as terephthalic acid and 5-hydroxyisophthalic acid; benzene-tricarboxylic acids such as 1,3,5-benzenetricarboxylic acid and 1,2,4-benzenetricarboxylic acid; propanetricarboxylic acids such as 2-phenyl-1,2,3-propanetricarboxylic acid, 1-phenyl-1,2,3-propanetricarboxylic acid, 2-hydroxy-1,2,3-propanetricarboxylic acid, and 3-hydroxy-1,2,3-propanetricarboxylic acid; and pyromellitic acid and the like. Among these, those having a primary acid dissociation constant in water of $50 \times 10^{-5}$ or less are preferably employed.

The carboxylic acid (b) is employed in an amount from 0.1 to 30 parts by weight, preferably from 1 to 20 parts by weight, based on 100 parts by weight of the ethylenic copolymer (a). An amount less than 0.1 parts by weight causes insufficient crosslinking, and a foam having satisfactory impact resilience cannot be obtained. An amount exceeding 30 parts by weight causes excessive crosslinking, resulting in a reduced expansion ratio, thereby producing a hard foam having poor impact resilience.

As the foaming agent of a thermal decomposition type (c), a foaming agent having a decomposition temperature higher than the melting temperature of the ethylenic copolymer (a) is employed. For example, a foaming agent having a decomposition temperature from about 120° to 230° C., preferably from about 150° to 230° C., is employed.

Examples are azo compounds such as azodicarbonic amide, 2,2'-azobisisobutylonitrile, and diazodiaminobenzene; sulfonyl hydrazide compounds such as benzene sulfonyl hydrazide, benzene-1,3-sulfonyl hydrazide, diphenylsulfone-3,3'-disulfonyl hydrazide, diogenyloxide-4,4'-disulfonyl hydrazide, 4,4'-oxybis(benzenesulfonyl hydrazide), and p-toluene sulfonyl hydrazide; nitroso compounds such as N,N'-dinitorosopentamethylenetetramine and N,N'-dinitroso-N,N'-dimethyl terephthalic amide; azide compounds such as terephthalic azide and p-t-butyl benzazide; as well as carbonates such as sodium bicarbonate, ammonium bicarbonate, and ammonium carbonate. Among these, azodicarbonic amide is preferably employed.

The foaming agent of a thermal decomposition type (c) is generally employed in an amount from 1 to 20 parts by weight, preferably from 5 to 10 parts by weight, based on 100 parts by weight of the ethylenic copolymer (a).

The polyethylenic foaming composition according to the present invention is characterized in that it contains the ethylenic copolymer (a), the carboxylic acid (b), and the foaming agent of a thermal decomposition type as mentioned above, but it may further contain, if necessary, other components, including heat resistant stabilizers such as phenol-, sulfide- phosphite-, amine- or amide-based stabilizers, anti-aging agents, anti-weathering stabilizers, antistatic agents, metallic soaps, lubricants, pigments, as well as foaming aids, anti-foaming agents, liquid coatings, and a mold release agent.

Such components may be incorporated using an open roll, blender, high-shear rotating mixer, Banbury mixer, kneader, and the like, at a temperature which is lower than the decomposition temperature of the foaming agent of a thermal decomposition type (c) but which does not cause crosslinking between the ethylenic copolymer (a) and the carboxylic acid (b) in a standard method such as a mixing procedure while keeping the ethylenic copolymer (a) in a state of the ethylenic copolymer (a) being a powder or a melt mixing procedure. The polyethylenic foaming composition of the present invention may be produced in various forms such as a mass, powder, pellet, sheet, and the like, depending on the particular use.

For example, in case of producing a polyethylenic foaming composition powder (A) for use in a powder molding, a blender fitted with a jacket or a high-shear rotating mixer is usually employed. A preferred mixer is one capable of preventing blocking of the powder particles by means of applying shear stress, such as a high-shear rotating mixer. In such case, for the purpose of preventing heat fusion of the powder particles due to Shear heat generation, the mixing is generally conducted while cooling by circulating a coolant through the jacket. In such case, a powder which has previously been pulverized is employed as the ethylenic copolymer (a). The mean particle size is generally 32 mesh size (passing through a square pore of 500 μm×500 μm), preferably 40 mesh size (passing through a square pore of 355 μm×355 μm) to 100 mesh size (passing through a square pore of 150 μm×150 μm), when determined using a Tyler standard sieve. When a carboxylic acid (b) in the form of a solid is employed, a powder having a particle size of 100 μm or less is generally employed. When a carboxylic acid in the form of a liquid is employed, it is first admixed with the ethylenic copolymer (a) and then with the foaming agent of a thermal decomposition type (c).

Alternatively, the powder (A) may also be obtained by melt mixing the ethylenic copolymer (a), the carboxylic acid (b), the foaming agent of a thermal decomposition type (c), and other components at a temperature which is lower than the decomposition temperature of the foaming agent (c) but which does not cause crosslinking between the copolymer (a) and the carboxylic acid (b) using an extruder, followed by pulverizing the cooled composition at the glass transition temperature or below. In such case, the mean particle size of the powder (A) is adjusted generally to 32 mesh size or less, preferably 40 to 100 mesh size, when determined using a Tyler standard sieve.

To mold the powder (A), powder molding methods such as, for example, a fluidized immersion method, a powder sinterising method, an electrostatic coating method, a powder flame-spray method, a powder rotational molding method, a powder slush molding method (JPA 132507-1983), and the like are employed. The powder slush molding method is especially preferred.

When the powder slush method is employed, a molded foam can be produced via process (1) wherein a vessel containing a required amount of the powder (A) and having an opening and a mold which has been heated to a temperature sufficiently higher than the melting temperature of the ethylenic copolymer (a) and which has an opening attached to each other at their openings, or the former is inserted and immobilized in the cavity of the latter, and the unit thus assembled is rotated or shaken to supply the powder rapidly into the entire region of the cavity, thereby achieving adhesion of the powder to the internal wall of the mold followed by melting, and then excessive powder (A) is drained out into the vessel, followed by process (2) wherein the molded article obtained in process (1) is foamed by heating.

The mode of heating the mold employed in the powder molding method is not critical, and the gas-fired furnace system, the hot medium oil circulation system, the hot medium oil or hot fluidized sand immersion system, or the frequency induction heating system can be employed, and these methods may also be utilized in the process of the foaming of the melted foaming composition.

The temperature of the mold at which the powder (A) is deposited and melted on the internal wall of the mold is higher usually by 50° to 200° C., preferably by 80° to 170° C., than the melting temperature of the ethylenic copolymer (a), for example, 140° to 310° C., preferably 170° to 280° C. The time period of the deposition and the melting is not critical, and may vary depending on the size and the thickness of the molded article.

The temperature at which the foaming is effected should be within the range of 100° C., preferably within the range of 80° C., from the decomposition temperature of the foaming agent of a thermal decomposition type (c). The time period of the foaming is not specifically limited, and may vary depending on the thickness and the expansion ratio of the molded foam.

When a composition in the form of a bulk or a pellet obtained by melt mixing is employed, the composition may be molded by an extrusion molding method, a calender molding method, a pressing method, an injection molding method, and the like into a panel, pipe, film, sheet and the like, and then subjected to foaming by heating under atmospheric pressure or under pressure.

For example, in case of producing a foam sheet by the pressing method, a pressurized one shot method or pressurized two shot method is usually employed.

In the pressurized one shot method, a sheet is formed by a press molding machine. This molding is effected at a temperature lower than the decomposition temperature of the foaming agent of a thermal decomposition type (c) and higher usually by 10° to 50° C., preferably by 10° to 30° C., than the melting temperature of the ethylenic copolymer (a). The pressure to be applied is usually 0 to 100 kg/cm$^2$·G, and the time period is usually about 0.5 to 10 minutes.

After formation of the sheet, the press molding machine is further operated to heat the sheet at a temperature not lower than the decomposition temperature of the foaming agent for a predetermined period under pressure, and subsequently the pressure is withdrawn, thereby effecting the foaming. The temperature of heating may vary depending on the type of foaming agent employed, and is higher usually by 0° to 100° C., preferably by 20° to 50° C., than the decomposition temperature of the foaming agent. The pressure to be applied is usually 0 to 100 kg/cm$^2$·G, and the time period is usually about 0.5 to 10 minutes.

In the pressurized two shot method, after formation of the sheet, the press molding machine is further operated to heat the sheet under pressure for a predetermined period to allow the crosslinking reaction between the ethylenic copolymer (a) and the carboxylic acid (b) to proceed. The sheet is cooled once and then heated again under pressure. Withdrawal of the pressure results in a molded foam.

The first shot is usually conducted under conditions which allow crosslinking between the ethylenic copolymer (a) and the carboxylic acid (b) to proceed, but which does not cause the decomposition of the foaming agent of a thermal decomposition type (c), while the second shot is usually conducted under conditions which allow the decomposition of the foaming agent of a thermal decomposition type (c).

The temperature of heating is usually within the range of ±30° C. with regard to the decomposition temperature of the foaming agent (c) of a thermal decomposition type. The pressure to be applied is usually 0 to 100 kg/cm$^2$·G, and the time period is usually about 0.1 to 10 minutes.

When the molded article is detached from the mold, problems such a folding wrinkles may occur. To avoid such problems, it is useful to spray a fluorine- or silicon-based mold release agent onto the mold prior to the molding. When a relatively simple-shaped mold, such as a plate, is employed, a lining of a fluorine-based resin sheet may be advantageous.

It is also advantageous to incorporate a polymethylsiloxane compound as an internally added mold release agent into the composition especially in case of continuous production. Such compound usually has a viscosity at 25° C. of 20 centistokes or higher, preferably from 50 to 5000 centistokes, and is usually employed in an amount of 2 parts by weight based on 100 parts by weight of the ethylenic copolymer (a). An amount greater than 2 parts by weight may affect the heat fusion of the composition, resulting in a molded article having poor mechanical properties and causing staining of the mold due to the bleeding of the mold release agent out onto the surface of the mold.

On the other hand, by the procedure similar to that of process (1) of the powder slush molding method described above, except for employing a powder composition containing the thermoplastic elastomer (B) described below instead of the polyethylenic foaming composition powder (A), a non-foam layer is formed on the mold, and then by using this mold having the non-foam layer on it, the powder (A) is molded as a foam on the non-foam layer by process (1) and process (2), a composite foam in which the non-foam layer and the foam layer are integrated can be produced. To produce such a composite foam, methods other than the powder slush molding, for example, a fluidized immersion method, a powder sinterising method, an electrostatic coating method, a powder flame-spray method, a powder rotational molding method, and the like may also be employed, but the powder slush molding method is preferred.

(B) is a thermoplastic elastomer having a complex dynamic viscosity η*(1) of 1.5×10$^5$ poise or less and a Newtonian viscosity index n of 0.67 or less which is a composition consisting of an ethylene/α-olefinic copolymeric rubber and a polyolefinic resin or a partially-crosslinked composition consisting of an ethylene/α-olefinic copolymeric rubber and a polyolefinic resin.

As an ethylene/α-olefinic copolymeric rubber which is a component of the thermoplastic elastomer (B), rubbers containing an olefin as a major component, such as an ethylene/α-olefinic copolymeric rubber, an ethylene/α-olefinic/non-conjugate diene copolymeric rubber, and the like can be used. Examples of the α-olefin are propylene and 1-butene, and examples of the non-conjugate diene are dicyclopentadiene, ethylidene norbornene, 1,4-hexadiene, cyclooctadiene, methylene norbornene, and the like. Among these ethylene/α-olefinic copolymeric rubbers, ethylene/propylene/ethylidene norbornene copolymeric rubber (hereinafter referred to as EPDM) is preferably employed, and when incorporated into an elastomer, provides a composite foam having excellent heat resistance and sufficient impact resilience of the foam layer.

The Mooney viscosity (determined at 100° C. (ML$_{1+4}$ 100° C.) according to ASTM D-927-57T) of the ethylene/α-olefinic copolymeric rubber is usually within the range from 130 to 350, preferably from 200 to 300.

The ethylene/α-olefinic copolymeric rubber may also be employed in the form of an oil extended rubber obtained by admixing a mineral oil-based softener such as paraffin-based process oil. In such case, the melt fluidity is increased and the pliability of the molded article is also increased. The amount of the mineral oil-based softener is usually up to 120 parts by weight, preferably 30 to 120 parts by weight, based on 100 parts by weight of the ethylenic/α-olefinic copolymeric rubber.

As the polyolefinic resin which is the other component of the thermoplastic elastomer (B), polypropylene, propylene/ethylene copolymer, and copolymers of propylene with α-olefins other than propylene are preferably employed. Especially when a copolymeric resin of propylene with 1-butene is employed, the hardness of the molded article can also be reduced.

Since the heat fusion of the powder during the powder molding process becomes insufficient and the strength of the molded article thus obtained becomes lower when the melt flow rate (MFR, determined at 230° C. with 2.16 kg loading according to JIS K-7210) of the polyolefinic resin is less than 20 g/10 minutes, a resin having an MFR of 20 g/10 minutes or more is generally employed. Preferably, the MFR is 50 g/10 minutes.

The thermoplastic elastomer (B) employed in the present invention is a composition of the ethylene/α-olefinic copolymeric rubber and the polyolefinic resin or a partially crosslinked composition obtained by crosslinking the composition as described above, and the weight ratio of the ethylene/α-olefinic copolymeric rubber and the olefinic resin is preferably 5:95 to 80:20.

To produce a partially crosslinked composition, an organic peroxide is usually employed as a crosslinking agent. When an organic peroxide is employed, a dialkylperoxide is preferably employed. Dynamic crosslinking in the presence of a crosslinking aid such as a bismaleimide compound using a trace amount of an organic peroxide is preferable, and in such case, a suitable degree of crosslinking of the ethylene/α-olefinic copolymeric rubber provides improved heat resistance as well as increased fluidity. The crosslinking agent is employed in an amount of 1.5 parts by weight or less, preferably 0.6 parts by weight or less, based on 100 parts by weight of the total amount of the ethylene/α-olefinic copolymeric rubber and the polyolefinic resin, and the organic peroxide is employed in an amount of 0.2 parts by weight or less, preferably 0.1 part by weight or less, and more preferably 0.07 parts by weight or less.

As a method for dynamic crosslinking, a continuous kneading extruder method, such as a single- or twin-screw kneading extruder, may preferably be employed. When a twin-screw kneading extruder is employed, the extrusion crosslinking when conducted at a shear rate less than 1×10$^3$ sec$^{-1}$ provides a larger particle size of the distributed particles of the ethylene/α-olefinic copolymeric rubber, resulting in difficulty in realizing the viscosity condition of the present invention. Accordingly, it is preferable to conduct the continuous extrusion crosslinking at a shear rate of 1×10$^3$ sec$^{-1}$ or higher.

The thermoplastic elastomer (B) in the present invention has a complex dynamic viscosity η* (1) of 1.5×10$^5$ poise or less, preferably 1.0×10$^5$ poise or less, and a Newtonian viscosity index n of 0.67 or less, preferably 0.60 or less.

The complex dynamic viscosity η* (1) is a value determined at 250° C. at a frequency of 1 radian/sec. When this value exceeds $1.5 \times 10^5$ poise, the composition powder containing the elastomer (B) is not melt-fluidized on the surface of the mold, and cannot be molded by the powder molding method in which the shear rate during the process is as low as 1 sec$^{-1}$ or less.

The Newtonian viscosity index n is a value calculated from the complex dynamic viscosity η* (1) mentioned above and the complex dynamic viscosity η* (100) determined at a frequency of 100 radian/sec using the following formula:

$$n = \{\log \eta^*(1) - \eta^*(100)\}/2$$

When the Newtonian viscosity index n exceeds 0.67, the dependency of the complex dynamic viscosity on the frequency is too high even if the complex dynamic viscosity η* (1) is $1.5 \times 10^5$ poise or less, and the powder molding method in which the compaction pressure upon molding is as low as 1 kg/cm$^2$ or less only provides a molded article having a low mechanical property due to the insufficient heat fusion of the composition powder.

When a partially-crosslinked composition is employed as a thermoplastic elastomer (B) in the present invention, a non-crosslinked ethylene/α-olefinic copolymeric rubber or ethylene/α-olefinic copolymeric resin may be blended in an amount of 50 parts by weight or less to 100 parts by weight of the elastomer for the purpose of improving the pliability of the molded article. In such case, propylene and 1-butene are employed independently or in a mixture as the α-olefin. An ethylene/propylene copolymeric rubber having an ethylene content from 40 to 90% by weight, preferably from 70 to 85% by weight, and having an $ML_{1+4}$ 100° C. of 50 or less, is preferred.

The composition powder containing the thermoplastic elastomer (B) in the present invention is usually prepared by pulverizing the composition containing the thermoplastic elastomer (B) at a low temperature of the glass transition temperature or below. For example, a freeze pulverization method using liquid nitrogen is preferably employed. A pellet of the composition containing the thermoplastic elastomer (B) which is cooled to −70° C. or below, preferably −90° C. or below, may be pulverized mechanically using an impact type pulverizer such as a ball mill. When the pellet is pulverized at a temperature higher than −70° C., the particle size becomes greater, resulting in poor powder moldability. In order to prevent the temperature of the composition from being raised to the glass transition temperature or higher during the pulverization operation, it is preferable that the internal temperature of the pulverizer such as a ball mill is kept at approximately −120° C. during pulverization. It is also preferred that the pulverizer itself is cooled externally. Pulverization is preferably conducted so that 95% or more of the total weight of the composition powder containing the thermoplastic elastomer (B) obtained passes through the 32 mesh screen of a Tyler standard sieve. When a powder having a size greater than 32 mesh size is present in an amount exceeding 5% by weight, a uniform thickness may not be obtained in the powder molding. An absence of uniformity in thickness leads to an absence of uniformity in the pliability of the molded article, which may cause folding wrinkles, resulting in poor commercial value of the molded article.

The composition powder containing the thermoplastic elastomer (B) in the present invention may contain an internally added mold release agent, which may be a polymethylsiloxane compound.

In such case, the polymethylsiloxane compound preferably has a viscosity at 25° C. of 20 centistokes or higher, more preferably from 50 to 5000 centistokes. An excessively high viscosity may reduce the releasing effect.

The internally added mold release agent is incorporated in an amount of 2 parts by weight or less per 100 parts by weight of the composition powder. An amount greater than 2 parts by weight affects the heat fusion of the powder, resulting in a molded article having poor mechanical properties, as well as a risk of staining the mold due to the bleeding of the mold release agent out onto the surface of the mold.

An internally added mold release agent may be added before or after pulverization.

The composition powder containing the thermoplastic elastomer (B) in the present invention may contain heat resistant stabilizers such as phenol-, sulfide-, phenyl-, alkane-, phosphite-, amine- or amide-based stabilizers, anti-aging agents, anti-weathering stabilizers, antistatic agents, metallic soaps, lubricants such as waxes, collaring pigments, or the like. These additives may be incorporated before or after pulverization.

When a molded composite foam is prepared by the powder slush molding method, (1) a vessel containing the composition powder containing the thermoplastic elastomer (B) and a mold which has been heated to a temperature sufficiently higher than the melting temperature of the elastomer (B) and which has a complex emboss pattern on the internal wall are integrated with each other and the unit thus assembled is rotated or shaken to effect the adhesion of the powder to the internal wall of the mold, followed by melting and draining the non-melted excess powder off; (2) then the vessel is taken out, and a vessel containing the polyethylenic foaming composition powder (A) and a mold which has been heated to a temperature sufficiently higher than the melting temperature of the ethylenic copolymer (a) and on which the non-foam layer obtained in the preceding step has been mounted are integrated similarly, and the unit thus assembled is moved similarly to effect the adhesion of the powder (A) onto the non-foam layer on the mold, followed by melting and draining the non-melted excess powder off into the vessel; and (3) subsequently, the vessel is taken out and the molded article is foamed while heating.

The molded composite foam of the present invention may have a composite multilayer consisting of a non-foam layer/ foam layer/non-foam layer. In such case, the processes (1) and (2) described above are conducted, and then process (1) is conducted again, and subsequently process (3) is conducted to obtain such a multilayer.

In addition, an intermediate layer obtained from a non-foaming composition which is the polyethylenic foaming composition powder (A) excluding the foaming agent of a thermal decomposition type (c) may be provided between the non-foam layer and the foam layer. In such case, a composite foam having excellent adhesion of the non-foam layer and the foam layer is obtained.

The mode of heating of the mold in the powder molding for production of the molded composite foam described above is not particularly critical, and the various methods mentioned above may be employed.

The powder molding temperature in the production of the molded composite foam is generally 160° to 300° C., preferably 180° to 280° C. The time period of the molding is not critical, and may vary depending on the size and thickness of the molded article. The temperature at which the foaming composition is foamed is generally 180° to 280° C., preferably 180° to 260° C. The time period of the foaming is not critical, and may vary depending on the thickness and the expansion ratio of the foam layer.

Since the molded composite foam of the present invention thus obtained has excellent lightness in weight and cleanness, an increased expansion ratio of the foam layer, and excellent impact resilience, it can be widely used in various applications. Among them, it may preferably be employed as a top layer of a multilayer molded article.

As a multilayer molded article having the molded composite foam as a top layer according to the present invention, a multilayer molded article having as a substrate material a thermoplastic resin such as polypropylene, a propylene/α-olefinic copolymer, a propylene/ethylene copolymer, a polystyrene-based resin, a polyethylenic resin, and a methacrylic resin and a thermosetting resin such as a semirigid urethane, rigid urethane, and an epoxy resin can be used. A preferred thermoplastic resin is polypropylene, while a preferred thermosetting resin is rigid urethane.

To the thermoplastic resin employed in the present invention, various additives such as fillers such as inorganic fillers and glass fibers, pigments, lubricants, antistatic agents, stabilizers and the like may be incorporated if desired.

In a method of integrating the top layer and the thermoplastic resin layer, the top layer obtained, for example, by the powder molding method, is integrated to a mold base in a male or female mold for compression molding while being retained on the mold for the powder molding, and the molten thermoplastic resin is supplied to a cavity between the exposed surface of the top layer and the male or female mold. Then the male mold and the female mold are pressed to each other, thereby achieving the integration of the top layer and the thermoplastic resin layer. Since the top layer on which the emboss pattern of the molds has been transferred is subjected to the molding of the thermoplastic resin while being retained on the mold, a multilayer molded article can be obtained without affecting the pattern on the top layer.

The mold for the top layer and the mold for the thermoplastic resin layer are not necessarily the same. For example, the top layer may be released from the mold therefor and then retained in one of the male or female molds. Then the molten thermoplastic resin is fed to the cavity between the top layer and the other mold. Then by pressing both molds to each other, the top layer is integrated with the thermoplastic resin layer.

To feed the molten thermoplastic resin, it is preferable to press the molds to each other after or during feeding. In such case, a multilayer molded article can be obtained in which the top layer exhibits less deviation and more excellent transfer of the pattern when compared to that obtained by a method wherein the resin is fed to the mold which has already been pressed to each other.

The method of feeding of the molten thermoplastic resin is not critical. For example, the resin may be fed via a resin inlet provided in a mold facing the back of the top layer. Alternatively, a hose for supplying the molten resin is inserted into the cavity between the male mold and the female mold to feed the molten resin, and then, after feeding, the hose for supplying is drawn out of the system and then both molds are closed. Lateral pressing of the molds may also be employed.

As a male mold and a female mold, molds capable of being slid on each other at their circumference thereby effecting closing may be employed. When the clearance of the sliding surfaces between both molds is almost equal to the thickness of the top layer, the molding is completed while leaving the top layer material at the edge of the article to allow the folding back of the remaining top layer material, thereby obtaining an article whose external circumference is covered entirely with the top layer material.

In a method of integrating the top layer and the thermosetting resin layer consisting of, for example, urethane, the top layer obtained by the powder molding is retained on the mold for the powder molding while a mixture of a polyol, a setting catalyst such as an amine, and polyisocyanate is poured into the cavity, thereby effecting setting.

Since the multilayer molded article thus obtained according to the present invention has excellent lightness in weight, excellent cleanness, excellent impact resilience, and a sophisticated appearance, it can be used in a wide range of applications.

In the automobile industry, the present molded multilayer article can be useful in interior top layer materials of the instrument panel, console box, arm rest, head rest, door trim, rear panel, pillar trim, sunvisor, trunkroom trim, trunk lid trim, airbag housing, sheet buckle, headliner, glove compartment, steering wheel cover, ceiling, and the like; interior molded articles like the kicking plate, change lever bouts, ceiling, and the like; and exterior parts such as the spoiler, side mall, number plate housing, mirror housing, airdom skier, matguard, and the like.

In the field of domestic electric instruments and office automation instruments, the present molded multilayer article is useful in exterior materials of a television monitor, video tape recorder, automatic laundry washer, laundry drier, cleaner, air conditioner, and the like.

In the field of sport recreational items, the present molded multilayer article is useful in interior materials of a boat, and in beach recreational items. In the field of architecture and house building, it is useful in furniture, desks, chairs, gates, doors, fences, wall ornaments, ceiling ornaments, floors of kitchens and restrooms, and the like. It is useful also in industrial materials and notions.

ADVANTAGE OF THE PRESENT INVENTION

By using the polyethylenic foaming composition of the present invention, a foam having excellent lightness in weight, excellent cleanness, uniform foam cells, high expansion ratio, and excellent impact resilience can be obtained.

Since the molded composite foam of the present invention has excellent lightness in weight, excellent cleanness, excellent impact resilience, and a high expansion ratio of the foam layer, it can be applied in various fields. The molded composite foam having the foam layer as the outer layer is preferably employed as a top layer material of a multilayer molded article since it exhibits excellent adhesion to the resin use as the substrate.

EXAMPLES

The present invention is further described in the following examples that are not intended to restrict the scope of the present invention in any way.

In the examples and comparative examples, the appearance of the molded foam, the state of foam cells, the expansion ratio, and the impact resilience are evaluated as follows.

Appearance of molded foam

The molded foam was observed macroscopically and evaluated as follows.

⊚: Uniform foaming without variation in thickness

○: Almost uniform foaming with some variation in thickness x: Variable foaming with great variation in thickness State of foam cells A sectional surface of a molded foam was observed macroscopically and evaluated as follows.

⊚: Uniform cells o: Slightly variable cells x: Variable cells

Expansion ratio

Expansion ratios are calculated as follows.

Expansion ratio=Density of non-foam/Density of foam

The density was determined using a densimeter (Densimeter-H: Toyo Seiki Seisakusyo). The non-foam is an article obtained by melting a polyethylenic foaming composition followed by cooling without foaming.

Impact resilience

In compliance with JIS K6031, a prescribed iron rod was allowed to fall freely and hit against the test floor at room temperature. From the height from which the rod fell down and the height to which the rod bounded up, impact resilience (%) was determined and evaluated as follows.

⊚: Impact resilience of 20% or more o: Impact resilience of 10% or more and less than 20% x: Impact resilience less than 10%

Example 1

100 parts by weight of ethylenic copolymer powder (Bondfast 70B-P: Sumitomo Chemical, MFR=90 g/10 minutes) consisting of 83% by weight of ethylene units, 12% by weight of glycidyl methacrylate units and 5% by weight of vinyl acetate, 20 parts by weight of adipic acid (primary dissociation constant in water $K_1=3.7\times10^{-5}$), and 10 parts by weight of a foaming agent of a thermal decomposition type, namely, azodicarbonic amide (Cellmic C-191: Sankyo Chemical Co., Ltd., decomposition temperature 210° C.) were placed in a high-shear mixer (Supermixer SMV-20: Kawada Seisakusho), and the mixture was blended for 3 minutes at 500 rpm at room temperature to obtain a polyethylenic foaming composition powder.

The powder was dusted onto a plane mirror mold at 250° C., and allowed to stand for 12 seconds. Then the excessive powder was drained off.

The mold was then placed in a Geer oven at 230° C. as the atmospheric temperature, and heated for 120 seconds to effect the foaming. Then the mold was taken out of the Geer oven and cooled in water to release the foam from the mold. The results of the evaluation of the foam obtained are shown in Table 1.

Examples 2 to 9

Instead of the adipic acid employed in Example 1, 10 parts by weight of succinic acid ($K_1=6.4\times10^{-5}$: Example 2), 10 parts by weight of isophthalic acid ($K_1=6.4\times10^{-5}$: Example 3), 10 parts by weight of terephthalic acid ($K_1=29\times10^{-5}$: Example 4), 2 parts by weight of fumaric acid ($K_1=96\times10^{-5}$: Example 5), 2 parts by weight of phthalic acid ($K_1=110\times10^{-5}$: Example 6), 2 parts by weight of succinic acid ($K_1=5400\times10^{-5}$: Example 7), 2 parts by weight of dimeric acid (liquid dicarboxylic acid, Versadime, 216: Henkel Hakusui: Example 8) and 5 parts by weight of 1,3,5-benzenetricarboxylic acid (Nacalai Tesque: Example 9) were respectively employed, and a procedure otherwise similar to that in Example 1 was employed to obtain the respective foams. The results of evaluation are shown in Table 1.

Examples 10 and 11

Instead of Bondfast 70B-P, ethylenic copolymer powder (Sumitomo Chemical, MFR=280 g/10 minutes: Example 10) consisting of 85% by weight of ethylene units and 15% by weight of glycidyl methacrylate units and ethylenic copolymer powder (Bondfast 20B: Sumitomo Chemical, MFR=20 g/10 minute: Example 11) were respectively employed, and a procedure otherwise similar to that in Example 1 was employed to obtain the respective foams. The results of evaluation are shown in Table 1.

Example 12

Except for using Bondfast 20B instead of Bondfast 70B-P and using 5 parts by weight of terephthalic acid instead of adipic acid, a procedure similar to that in Example 1 was employed to obtain a foam. The results of evaluation are shown in Table 1.

Example 13

A foam was obtained similarly as in Example 12 except for employing adipic acid in an amount of 1 part by weight. The results of evaluation are shown in Table 1.

Example 14

A foam was obtained similarly as in Example 12 except for employing adipic acid in an amount of 0.5 parts by weight. The results of evaluation are shown in Table 1.

Example 15

A foam was obtained similarly as in Example 1 except for using ethylenic copolymer powder (Bondfast 7B: Sumitomo Chemical, MFR=10 g/10 minutes) consisting of 83% by weight of ethylene units, 12% by weight of glycidylmethacrylate units, and 5% by weight of vinyl acetate units instead of Bondfast 70B-P, and 5 parts by weight of terephthalic acid instead of adipic acid. The results of evaluation are shown in Table 1.

Example 16

A foam was obtained similarly as in Example 1 except for using ethylenic copolymer powder (Sumitomo Chemical, MFR=10 g/10 minutes) consisting of 79% by weight of ethylene units, 6% by weight of glycidylmethacrylate units and 15% by weight of vinyl acetate units instead of Bondfast 70B-P, and 10 parts by weight of terephthalic acid instead of adipic acid. The results of evaluation are shown in Table 1.

Example 17

A foam was obtained similarly as in Example 1 except for using 5 parts by weight of terephthalic acid instead of adipic acid, and using Cellmic C-1 (azodicarbonic amide, Sankyo Chemical Co., Ltd., decomposition temp.: 205° C.) instead of Cellmic C-191. The results of evaluation are shown in Table 1.

Example 18

A polyethylenic foaming composition powder was obtained similarly as in Example 1 except for using Bondfast 20B instead of Bondfast 70B-P, and using 5 parts by weight of isophthalic acid instead of adipic acid.

The powder was dusted onto a plane mirror mold at 270° C., and allowed to stand for 12 seconds. Then the excessive powder was drained off.

The mold was then placed in a Geer oven at 250° C. as the atmospheric temperature, and heated for 120 seconds to effect the foaming. Then the mold was taken out of the Geer oven and cooled in water to release the foam from the mold. The results of the evaluation of the foam obtained are shown in Table 1.

Comparative Example 1

A foam was obtained similarly as in Example 1 except for using no adipic acid. The results of evaluation are shown in Table 1.

Comparative Example 2

A foam was obtained similarly as in Example 1 except for using polyethylene powder (Flo-thene UF-80: Sumitomo Seika, MFR=75 g/10 minutes) instead of Bondfast 70B-P. The results of evaluation are shown in Table 1.

Comparative Example 3

A foam was obtained similarly as in Example 1 except for using the thermoplastic elastomer powder obtained as described below instead of Bondfast 70B-P. The results of evaluation are shown in Table 1.

50 parts by weight of an oil extended EPDM ($ML_{1+4}$ 100° C.=53) obtained by admixing 100 parts by weight of EPDM ($ML_{1+4}$ 100° C.=242, propylene content=28% by weight, iodine value=12) and 100 parts by weight of a mineral oil-based softener (Diana Process PW-380: Idemitsu Kosan), 50 parts by weight of propylene-ethylene random copolymer resin (ethylene content=5% by weight, MFR=90 g/10 minutes) and as a crosslinking coagent, 0.4 parts by weight of a bismaleimide compound (Sumifine BM: Sumitomo Chemical), were mixed for 10 minutes in a Banbury mixer, and then extruded as a pellet to obtain a master batch for partial crosslinking.

To 100 parts by weight of this master batch, 0.04 parts by weight of an organic peroxide, 2,5-dimethyl-2,5-bis(t-butylperoxy)hexane (Sanperox APO: Sanken Chemical Co., Ltd.) was added, and dynamic crosslinking was effected at 220° C. using a twin screw kneader (TEX-44: Japan Steel Works, Ltd.) to obtain an elastomer composition pellet. After cooling this pellet with liquid nitrogen to −100° C., the pellet was pulverized as frozen to obtain a thermoplastic elastomer powder for powder molding which had a complex dynamic viscosity $\eta^*$ (1) of $6.4 \times 10^3$ poise and a Newtonian viscosity index n of 0.38. 99% by weight of this powder passed the 32 mesh screen of Tyler standard sieves.

Comparative Example 4

A foam was obtained similarly as in Example 1 except for using 10 parts by weight of benzoic acid ($K_1=6.3 \times 10^{-5}$) instead of adipic acid. The results of evaluation are shown in Table 1.

Comparative Example 5

A foam was obtained similarly as in Example 1 except for using 5 parts by weight of polyacrylic acid (Aldrich, weight mean molecular weight: 2000) instead of adipic acid. The results of evaluation are shown in Table 1.

TABLE 1

| | Appearance of foam | State of foam cells | Expansion ratio | Impact resilience |
|---|---|---|---|---|
| Example 1 | ◎ | ◎ | 4.5 | ◎ |
| Example 2 | ◎ | ◎ | 4.5 | ◎ |
| Example 3 | ◎ | ◎ | 4.8 | ◎ |
| Example 4 | ◎ | ◎ | 4.5 | ◎ |
| Example 5 | ○ | ◎ | 4.2 | ◎ |
| Example 6 | ○ | ◎ | 3.9 | ◎ |
| Example 7 | ◎ | ◎ | 1.7 | ○ |
| Example 8 | ◎ | ◎ | 4.6 | ◎ |
| Example 9 | ◎ | ◎ | 5.7 | ◎ |
| Example 10 | ◎ | ◎ | 4.5 | ◎ |
| Example 11 | ◎ | ◎ | 3.8 | ◎ |
| Example 12 | ◎ | ◎ | 5.0 | ◎ |
| Example 13 | ◎ | ◎ | 4.3 | ◎ |
| Example 14 | ◎ | ◎ | 4.0 | ○ |
| Example 15 | ◎ | ◎ | 4.6 | ◎ |
| Example 16 | ◎ | ◎ | 4.4 | ◎ |
| Example 17 | ◎ | ◎ | 5.5 | ◎ |
| Example 18 | ◎ | ◎ | 4.2 | ◎ |
| Comparative 1 | ◎ | ◎ | 3.5 | x |
| Comparative 2 | ◎ | ◎ | 3.2 | x |
| Comparative 3 | ◎ | ◎ | 3.5 | x |
| Comparative 4 | ◎ | ◎ | 3.6 | x |
| Comparative 5 | ◎ | ◎ | 3.7 | x |

Example 19

5000 g of a thermoplastic elastomer powder similar to that employed in Comparative Example 3 and 50 g of black pigment (PV-801, Sumika Color) were fed to a 20 L Supermixer, and mixed at 500 rpm for 10 minutes to obtain a composition powder containing the thermoplastic elastomer for use in a non-foam layer.

Using two stainless cases (powder feeding boxes) shown in FIGS. 1 to 3, 4000 g of the composition powder for the non-foam layer was fed to one, and 4000 g of the polyethylenic foaming composition powder prepared similarly as in Example 1 was fed to the other. This case has rectangular opening 1 (600 mm×220 mm), a depth of 210 mm, and was attached to single screw rotating device 3.

Separately, the nickel embossed mold shown in Figure 4 to FIG. 6, which had opening 4 similar in size to opening 1 provided on the powder feeding box shown in FIG. 1, was pre-heated in a gas furnace. This mold had a thickness of 3 mm, and a complicated inner surface pattern, such as rope twist pattern 5 and leather grain pattern 6. Once the internal temperature of the mold became 300° C., the heated mold was placed with opening 4 facing down and meeting opening 1 on the powder feeding box containing the composition powder for non-foam layer described above, and the frames attached to both openings were attached firmly to each other and fixed with clip 2, thereby achieving integration. Once the surface temperature of the mold became 270° C., the powder feeding box containing the composition powder for the non-foam layer was rotated by 180°, and the powder was allowed to be in contact with the mold for 7 seconds, thereby effecting the fusion. Immediately after this, the powder feeding box was rotated by 180° again to return to the lower position, and the excess powder was allowed to fall down to the powder feeding box.

Immediately after this, opening 4 of the mold in which a non-foam layer had been molded was faced down and placed on opening 1 of the powder feeding box containing the polyethylenic foaming composition powder. The frames of both openings were attached firmly to each other and fixed with clip 2, thereby achieving integration. At this time, the surface temperature of the mold was 240° C. Immediately after this, the powder feeding box containing the polyethylenic foaming composition powder was rotated by 180°, and the powder was allowed to be in contact with the mold for 15 seconds, thereby effecting fusion. Immediately after this the powder feeding box was rotated by 180° again to return to the lower position and the excess powder was allowed to fall down to the powder feeding box.

The mold was released with opening 4 facing down. The mold was further heated in a heating furnace at 230° C. for 2 minutes to form a foam layer. After cooling, the foam was released to yield a molded composite foam consisting of a foam layer and a non-foam layer.

The molded composite foam thus obtained had a thickness of the non-foam layer of 0.5 mm and a thickness of the foam layer of 6.5 mm, and the rope twist pattern and the leather grain pattern had been transferred precisely onto the surface of the non-foam layer. The foam layer showed no variation in thickness, and exhibited uniformity of the foamed cells. It had an expansion ratio of 4.5 and an impact resilience of 20% or higher.

Example 20

A foaming composition powder was obtained similarly as in Example 1 except for employing Bondfast 20B instead of Bondfast 70B-P, and 5 parts by weight of terephthalic acid instead of adipic acid.

The composition was heated under pressure at 130° C. and 50 kg/cm$^2$·G for 5 minutes using a press molding machine to obtain a sheet having a thickness of 1 mm.

The sheet was cut into 6 cm×6 cm square pieces, which were inserted in the cavity of a mold which had previously been heated to 220° C., sandwiched between iron plates whose surfaces had been coated with polyethylene terephthalate and which had been heated at the same temperature, heated under pressure at 10 kg/cm$^2$·G for 60 seconds using a press which had been heated at the same temperature, and then taken out and allowed to stand to cool to obtain a foam. The results of the evaluation are shown in Table 2.

Example 21

A foam was obtained similarly as in Example 20 except for employing 1 part by weight of adipic acid instead of terephthalic acid. The results are shown in Table 2.

Example 22

A polyethylene foaming composition was obtained similarly as in Example 20 except that kneading was conducted using a Laboplastmill (30C150: Toyo Seiki Seisakusho) at 120° C. at 50 rpm for 5 minutes instead of using a high-shear mixer at room temperature at 500 rpm for 3 minutes.

The composition was heated under pressure at 120° C. and 50 kg/cm$^2$·G using a press molding machine to obtain a sheet having a thickness of 1 mm.

The sheet was then foamed similarly as in Example 20 to obtain a foam. The results are shown in Table 2.

Comparative Example 6

A foam was obtained similarly as in Example 20 except that no terephthalic acid was used. The results of evaluation of the molded article obtained are shown in Table 2.

Comparative Example 7

A foam was obtained similarly as in Example 20 except for using 5 parts by weight of benzoic acid instead of terephthalic acid. The results of evaluation of the molded article are shown in Table 2.

Comparative Example 8

A procedure similar to that in Example 20 was employed except that 283.3 parts of a copolymer consisting of 91% by weight of ethylene units, 3% by weight of maleic anhydride units, and 6% by weight of methyl-acrylate units (Bondine LX 4110: Sumitomo Chemical, MFR=5 g/10 minutes, Maleic anhydride units: Glycidyl methacrylate units= 100:100 in this case) was employed instead of terephthalic acid, and Cellmic C-191 was employed in an amount of 19.3 parts by weight. The results of evaluation of the molded article obtained are shown in Table 2.

Comparative Example 9

A procedure similar to that in Example 20 was employed except that 13.4 parts of a copolymer consisting of 93% by weight of ethylene units and 7% by weight of acrylic acid units (A 201M: Mitsubishi Yuka, MFR=7 g/10 minutes, Acrylic acid units: Glycidyl methacrylate units=15:100 in this case) was employed instead of terephthalic acid, and Cellmic C-191 was employed in an amount of 5.6 parts by weight. The results of evaluation of the molded article obtained are shown in Table 2.

Comparative Example 10

A procedure similar to that in Example 20 was employed except that 88 parts of a copolymer consisting of 93% by weight of ethylene units and 7% by weight of acrylic acid units (A 201M: Mitsubishi Yuka, MFR=7 g/10 minutes, Acrylic acid units: Glycidyl methacrylate units=100:100 in this case) was employed instead of terephthalic acid, and Cellmic C-191 was employed in an amount of 9.4 parts by weight. The results of evaluation of the molded article obtained are shown in Table 2.

Comparative Example 11

A procedure similar to that in Example 20 was employed except that 61.7 parts of a copolymer consisting of 93% by weight of ethylene units and 7% by weight of acrylic acid units (A 201M: Mitsubishi Yuka, MFR=7 g/10 minutes, Acrylic acid units: Glycidyl methacrylate units=70:100 in this case) was used instead of terephthalic acid, and Cellmic C-191 was employed in an amount of 8 parts by weight. The results of evaluation of the molded article obtained are shown in Table 2.

Example 23

According to the procedure in Example 20, a sheet having a thickness of 1 mm was obtained.

The sheet was cut into 6 cm×6 cm square pieces, which were inserted in the cavity of a mold which had previously been heated to 220° C., sandwiched between iron plates whose surfaces had been coated with polyethylene terephthalate and which had been heated at the same temperature, heated-under pressure at 10 kg/cm$^2$·G for 60 seconds using a press which had been heated at the same temperature, and then taken out and allowed to stand to cool to obtain a foam.

The results of the evaluation of the molded article obtained are shown in Table 2.

Example 24

A foam was obtained similarly as in Example 23 except for using 2 parts by weight of adipic acid instead of terephthalic acid. The results of evaluation of the molded article obtained are shown in Table 2.

Comparative Example 12

A foam was obtained similarly as in Example 23 except that no terephthalic acid was used. The results of evaluation of the molded article obtained are shown in Table 2.

Comparative Example 13

A foam was obtained similarly as in Example 23 except for using 5 parts by weight of benzoic acid instead of terephthalic acid. The results of evaluation of the molded article obtained are shown in Table 2.

TABLE 2

|  | Appearance of foam | State of foam cells | Expansion ratio | Impact resilience |
|---|---|---|---|---|
| Example 20 | ⊚ | ⊚ | 5.8 | ⊚ |
| Example 21 | ⊚ | ⊚ | 3.9 | ⊚ |
| Example 22 | ⊚ | ⊚ | 5.4 | ⊚ |
| Example 23 | ⊚ | ⊚ | 4.2 | ⊚ |
| Example 24 | ⊚ | ⊚ | 5.8 | ⊚ |
| Comparative 6 | ⊚ | ⊚ | 1.7 | x |
| Comparative 7 | ⊚ | ⊚ | 1.6 | x |
| Comparative 8 | — | x | 1.1 | x |
| Comparative 9 | x | o | 1.5 | x |
| Comparative 10 | — | x | 1.0 | x |
| Comparative 11 | — | x | 1.2 | x |
| Comparative 12 | ⊚ | ⊚ | 1.8 | x |
| Comparative 13 | ⊚ | ⊚ | 1.8 | x |

In the examples and comparative examples shown below, appearance of the top layer and the foam layer of a molded composite foam, thickness of the molded composite foam, state of foam cells of the foam layer, expansion ratio of the foam layer, and impact resilience are evaluated as follows.

Appearance of top layer of molded composite foam

The top layer was observed macroscopically and evaluated as follows:
- o: No pinhall
- x: Pinhall Appearance of foam layer of molded composite foam The foam layer was observed macroscopically and evaluated as follows:
- o: Uniform foaming without variation in thickness
- Δ: Almost uniform foaming with some variation in thickness
- x: Variable foaming with great variation in thickness
- xx: Almost no foaming Thickness of molded composite foam The thicknesses of the non-foam layer and the foam layer were determined using a dial gauge (Toyo Seiki Seisakusho).

State of foam cells of foam layer

Sectional surface of a foam was observed macroscopically and evaluated as follows:
- o: Uniform cells
- Δ: Slightly variable cells
- x: Variable cells Expansion ratio of foam layer The foam layer was delaminated and the expansion ratio was calculated as follows:

Expansion ratio=Density of non-foam/Density of foam

The density of the foam layer was determined using a densimeter (Densimeter-H: Toyo Seiki Seisakusho). The non-foam is an article obtained by melting a polyethylenic foaming composition similar to that used for the foam layer followed by cooling without foaming.

Impact resilience of molded composite foam

In compliance with JIS K6301, a prescribed iron rod was allowed to fall freely and hit against the test floor at room temperature. From the height from which the rod fell down and the height to which the rod bounded up, impact resilience (%) was determined and evaluated as follows:
- ⊚: Impact resilience of 20% or more
- o: Impact resilience of 10% or more and less than 20%
- x: Impact resilience less than 10%

Complex dynamic viscosity of thermoplastic elastomer

Using Dynamic Analyzer Model RDS-7700 (Rheometrics Co.), the dynamic viscosities at 250° C. and at the frequencies of 1 and 10 radian/sec were determined while adding a strain of 5% by parallel plate mode, and calculating the complex dynamic viscosity $\eta^*$ (1) and $\eta^*$ (100), respectively.

Reference 1 (Preparation of a Thermoplastic Elastomer Powder)

50 parts by weight of an oil extended EPDM ($ML_{1+4}$ 100° C.=53) obtained by admixing 100 parts by weight of EPDM ($ML_{1+4}$ 100° C.=242, propylene content=28% by weight, iodine value=12) and 100 parts by weight of a mineral oil-based softener (Diana Process PW-380: Idemitsu Kosan), 50 parts by weight of propylene-1-butenen random copolymer resin (ethylene content=5% by weight, MFR=90 g/10 minutes) and as a crosslinking coagent 0.4 parts by weight of a bismaleimide compound (Sumifine BM: Sumitomo Chemical) were mixed for 10 minutes in a Banbury mixer, and then extruded as a pellet to obtain a master batch for partial crosslinking.

To 100 parts by weight of this master batch, 0.04 parts by weight of 2,5-dimethyl-2,5-bis(t-butylperoxy) hexane (Sanperox APO: Sanken Chemical Co., Ltd.) was added, and dynamic crosslinking was effected at 220° C. using a twin-screw kneader (TEX-44: Japan Steel Works, Ltd.) to obtain an elastomer composition pellet. After cooling this pellet with liquid nitrogen to −100° C., the pellet was pulverized as frozen to obtain a thermoplastic elastomer powder for powder molding which had a complex dynamic viscosity $\eta^*$ (1) of $6.4 \times 10^3$ poise and a Newtonian viscosity index n of 0.38.

99% by weight of this powder passed the 32 mesh screen of Tyler standard sieves.

Reference 2 (Preparation of Foaming Composition Powder)

100 parts by weight of Bondfast 70B-P, 20 parts by weight of adipic acid, and 5 parts by weight of Cellmic C-191 were placed in a high-shear mixer and mixed at room temperature at 500 rpm for 3 minutes to obtain a polyethylenic foaming composition powder.

99% by weight of this powder passed through the 32 mesh screen of Tyler standard sieves.

Example 25

An embossed nickel plate mold (15 cm×15 cm) was heated in a Geer oven at 300° C. When the surface temperature of the mold became 260° C., the thermoplastic elastomer powder obtained in Reference 1 was dusted and allowed to stand for 7 seconds. 5 seconds after draining the excess powder off, the foaming composition powder obtained in Reference 2 was dusted and allowed to stand for 15 seconds, and the excess powder was drained off.

The mold was then placed in a Geer oven at 240° C. as the atmospheric temperature, and heated for 120 seconds to effect the foaming.

Then the mold was taken out of the Geer oven and cooled in water to release the molded composite foam from the mold.

The results of the evaluation of the molded composite foam obtained are shown in Table 3.

Examples 26 to 30

Instead of adipic acid, 10 parts by weight of succinic acid ($K_1=6.4\times10^{-5}$: Example 26), 5 parts by weight of isophthalic acid ($K_1=24\times10^{-5}$: Example 27), 5 parts by weight of terephthalic acid ($K_1=29\times10^{-5}$: Example 28), 2 parts by weight of dimeric acid (Henkel Hakusui, liquid dicarboxylic acid, Versadime, 216: Example 29) and 5 parts by weight of 1,3,5-benzenetricarboxylic acid (Nacalai Tesque: Example 30) were respectively employed, and a procedure otherwise similar to that in Example 25 was employed to obtain the respective molded composite foams. The results of evaluation are shown in Table 3.

Example 31

An embossed nickel plate mold (15 cm×15 cm) was heated in a Geer oven at 300° C. when the surface temperature of the mold became 260° C., the thermoplastic elastomer powder obtained in Reference 1 was dusted and allowed to stand for 5 seconds. 5 seconds after draining the excess powder off, the foaming composition powder obtained similarly as in Reference 2 except for using 100 parts by weight of Bondfast 20B instead of Bondfast 70B-P, 5 parts by weight of terephthalic acid instead of adipic acid, and 5 parts by weight of Cellmic C-121 (azodicarbonic amide: Sankyo Chemical Co., Ltd., decomposition temperature: 206° C.) instead of Cellmic C-191 as a foaming agent was dusted and allowed to stand for 15 seconds, and the excess powder was drained off.

The mold was then placed in a Geer oven at 230° C. as the atmospheric temperature, and heated for 150 seconds to effect the foaming to obtain a molded composite foam. The results of the evaluation are shown in Table 3.

Example 32

A molded composite foam was obtained similarly as in Example 31 except for using 5 parts by weight of Cellmic C-1 (azodicarbonic amide: Sankyo Chemical Co., Ltd., decomposition temperature: 205° C.) instead of Cellmic C-121. The results are shown in Table 3.

Example 33

An embossed nickel plate mold (15 cm×15 cm) was heated in a Geer oven at 300° C. When the surface temperature of the mold became 245° C., the thermoplastic elastomer powder obtained in Reference 1 was dusted and allowed to stand for 7 seconds. 5 seconds after draining the excess powder off, the foaming composition powder obtained similarly as in Reference 2 except for using 2 parts by weight of phthalic acid ($K_1=110\times10^{-5}$) instead of adipic acid and 5 parts by weight of CAP-500 (azodicarbonic amide: Sankyo Chemical Co., Ltd., decomposition temperature: 150° C.) instead of Cellmic C-191 was dusted and allowed to stand for 15 seconds, and the excess powder was drained off. The mold was then placed in a Geer oven at 230° C. as the atmospheric temperature, and heated for 120 seconds to effect the foaming to obtain a molded composite foam. The results of the evaluation are shown in Table 3.

Example 34

A molded composite foam was obtained similarly as in Example 25 except for using as a foaming composition powder the composition powder obtained similarly as in Reference 2 except for using Bondfast 20B instead of Bondfast 70B-P and 1 part by weight of terephthalic acid instead of adipic acid. The results are shown in Table 3.

Example 35

A molded composite foam was obtained similarly as in Example 25 except for using as a foaming composition powder the composition powder obtained similarly as in Reference 2 except for using Bondfast 20B instead of Bondfast 70B-P and 0.5 parts by weight of terephthalic acid instead of adipic acid. The results are shown in Table 3.

Example 36

A molded composite foam was obtained similarly as in Example 25 except for using as a foaming composition powder the composition powder obtained similarly as in Reference 2 except for using Bondfast 7B instead of Bondfast 70B-P, 2 parts by weight of terephthalic acid instead of adipic acid, 5 parts by weight of Cellmic C-121 instead of Cellmic C-191, and a Geer oven at 250° C. instead of a Geer oven at 240° C. The results are shown in Table 3.

Example 37

A molded composite foam was obtained similarly as in Example 25 except for using as a foaming composition powder the composition powder obtained similarly as in Reference 2 except for using an ethylenic copolymer powder (Sumitomo Chemical, MFR=280 g/10 minutes) consisting of 85% by weight of ethylene units and 15% by weight of glycidylmethacrylate units instead of Bondfast 70B-P, and 2 parts by weight of terephthalic acid instead of adipic acid. The results are shown in Table 3.

Example 38

A molded composite foam was obtained similarly as in Example 25 except for using the foaming composition powder obtained from 100 parts by weight of Bondfast 70B-P, 5 parts by weight of terephthalic acid, and 5 parts by weight of Cellmic C-191 by kneading using a Laboplastmill at 120° C. at 50 rpm for 5 minutes followed by pulverizing as frozen instead of the foaming composition powder obtained in Reference 2. The results are shown in Table 3.

Example 39

An embossed nickel plate mold (15 cm×15 cm) was heated in a Geer oven at 300° C. When the surface temperature of the mold became 265° C., the thermoplastic elastomer powder obtained in Reference 1 was dusted and allowed to stand for 5 seconds. 5 seconds after draining the excess powder off, the non-foaming composition powder obtained similarly as in Reference 2 except for using 100 parts by weight of Bondfast 20B as an ethylenic copolymer powder, 5 parts by weight of terephthalic acid instead of adipic acid, and no foaming agent of a thermal decomposition type was dusted and allowed to stand for 3 seconds. After the excess powder was drained off, the mold was placed in a Geer oven at 240° C. as the atmospheric temperature, and heated for 30 seconds.

Immediately after this, the foaming composition powder obtained similarly as in Reference 2 except for using Bondfast 20B instead of Bondfast 70B-P and 5 parts by weight of terephthalic acid instead of adipic acid was dusted and allowed to stand for 15 seconds, and then the excess powder was drained off.

Comparative Example 16

A molded composite foam was obtained similarly as in Example 25 except for using as a foaming composition powder the composition powder obtained similarly as in Reference 2 except for using benzoic acid ($K_1=6.3\times10^{-5}$) instead of adipic acid. The results of evaluation are shown in Table 3.

Comparative Example 17

A molded composite foam was obtained similarly as in Example 25 except for using as a foaming composition powder the composition powder obtained similarly as in Reference 2 except for using polyacrylic acid (Aldrich, weight mean molecular weight=2000) instead of adipic acid. The results of evaluation are shown in Table 3.

TABLE 3

|  | Appearance of top layer | Thickness of top layer (mm) | Appearance of foam layer | Thickness of foam layer (mm) | State of foamed cells | Expansion ratio | Impact resilience |
| --- | --- | --- | --- | --- | --- | --- | --- |
| Example 25 | o | 0.8 | o | 5.0 | o | 4.9 | ⊙ |
| Example 26 | o | 0.8 | o | 4.8 | o | 4.8 | ⊙ |
| Example 27 | o | 0.9 | o | 4.6 | o | 4.5 | ⊙ |
| Example 28 | o | 0.8 | o | 5.1 | o | 5.2 | ⊙ |
| Example 29 | o | 0.8 | o | 4.6 | o | 4.5 | ⊙ |
| Example 30 | o | 0.8 | o | 4.4 | o | 4.7 | ⊙ |
| Example 31 | o | 0.7 | o | 4.4 | o | 6.0 | ⊙ |
| Example 32 | o | 0.8 | o | 4.8 | o | 6.0 | ⊙ |
| Example 33 | o | 0.7 | o | 3.2 | o | 3.4 | ⊙ |
| Example 34 | o | 0.8 | o | 3.8 | o | 4.0 | ⊙ |
| Example 35 | o | 0.8 | o | 3.5 | o | 3.8 | o |
| Example 36 | o | 0.8 | o | 3.0 | o | 3.8 | ⊙ |
| Example 37 | o | 0.8 | o | 4.0 | o | 3.5 | ⊙ |
| Example 38 | o | 0.8 | o | 5.0 | o | 5.0 | ⊙ |
| Example 39 | o | 0.7 + 0.3 | o | 4.0 | o | 5.0 | ⊙ |
| Comparative 14 | o | 0.8 | o | 3.6 | Δ | 3.5 | x |
| Comparative 15 | o | 0.8 | o | 3.5 | o | 3.5 | x |
| Comparative 16 | o | 0.8 | o | 3.6 | Δ | 3.6 | x |
| Comparative 17 | o | 0.8 | o | 3.7 | Δ | 3.7 | x |

The mold was placed in a Geer oven at 240° C. as the atmospheric temperature, and heated for 180 seconds to effect the foaming. After cooling, the molded article was detached. The results of evaluation of the molded composite foam thus obtained are shown in Table 3.

Comparative Example 14

A molded composite foam was obtained similarly as in Example 25 except for using as a foaming composition powder the composition powder obtained similarly as in Reference 2 except for using no adipic acid. The results of evaluation are shown in Table 3.

Comparative Example 15

A molded composite foam was obtained similarly as in Example 25 except for using as a foaming composition powder the composition powder obtained similarly as in Reference 2 except for using as an ethylenic copolymer powder the thermoplastic elastomer powder which is a partially crosslinked composition of EPDM employed in Reference 1 and propylene/1-butene random block copolymer resin (complex dynamic viscosity $\theta^*(1)=1\times10^4$ poise, Newtonian viscosity index n=0.41). The results of evaluation are shown in Table 3.

Example 40

An embossed nickel plate mold (30 cm×30 cm) was heated in a Geer oven at 300° C. When the surface temperature of the mold became 265° C., the thermoplastic elastomer powder obtained in Reference 1 was dusted and allowed to stand for 5 seconds. 5 seconds after draining the excess powder off, the foaming composition powder obtained similarly as in Reference 2 except for using Bondfast 20B instead of Bondfast 70B-P, 5 parts by weight of terephthalic acid instead of adipic acid, and 5 parts by weight of Cellmic C-121 instead of Cellmic C-191 as a foaming agent was dusted and allowed to stand for 15 seconds, and the excess powder was drained off.

The mold was then placed in a Geer oven at 240° C. as the atmospheric temperature, and heated for 150 seconds to effect the foaming.

The mold was then taken out from the Geer oven, and, after cooling, the molded composite foam was released from the mold.

Subsequently, the molded composite foam thus obtained was placed with the foam layer facing up on a mold for polyurethane which had previously been kept at 40° C. A mixture which had previously been prepared and containing polyol (RI-29: Takeda) and isocyanate (IS-DIP: Takeda) in a ratio of 100: 164 was then cast into the mold to form a rigid urethane layer, thereby obtaining a multilayer molded article, which was then taken out from the mold.

The multilayer molded article thus obtained had a thickness of the non-foam layer of 0.8 mm, a thickness of the foam layer of 4.8 mm, and a thickness of the rigid urethane layer of 4.5 mm, and exhibited satisfactory adhesion between the foam layer and the rigid urethane layer, which was reflected as delamination in 180 degrees delamination test (at 23° C., tensile speed of 200 mm/minute).

Example 41

5000 g of the thermoplastic elastomer obtained in Reference 1 and 50 g of black pigment (PV-801: Sumika Color) were fed to a 20 L Supermixer and mixed at 500 rpm for 10 minutes to obtain a composition powder containing the thermoplastic elastomer to be used for a non-foam layer.

As shown in FIG. 7, composition powder 9 obtained as above was introduced into vessel 7, and mold 8 for the powder molding which had previously been heated at 260° C. and had an emboss pattern was placed with its opening being met with the opening of the vessel, and the frames attached to both openings were attached firmly to each other and fixed, thereby effecting integration.

Immediately after this, the integrated vessel and the mold were rotated for 7 seconds by means of a single screw rotating device, and composition powder 9 was fed into the cavity of mold 8 for the powder molding and deposited onto the molding surface having the emboss pattern. After terminating the rotation, excess powder was drained off into vessel 7.

Then, the vessel containing the foaming composition powder obtained similarly as in Reference 2 was attached to be integrated with the mold, which was then rotated for 15 seconds by means of the single screw rotating device. After adhesion and fusion of the foaming composition, excess foaming composition powder was drained off into the vessel.

Subsequently, the mold was removed from the vessel, and the mold was heated at 230° C. for 2 minutes to form a foam layer. This was then cooled and solidified to yield molded composite foam 10 consisting of non-foam layer 11 and foam layer 12.

Then, as shown in FIG. 9, mold 9 for the powder molding which still retained molded composite foam 10 (top layer material) was transferred to the thermoplastic resin molding stage, where integration with mold base 13 was effected to yield female mold 14 for the thermoplastic resin molding.

Subsequently, as shown in FIG. 9, when thermoplastic resin molding female mold 14 and male mold 15 still remained open, molten thermoplastic resin 17 which was polypropylene resin (Sumitomo Noblen AX 568: Sumitomo Chemical, MFR=65 g/10 minutes) which had been heated at 190° C. was fed via resin passage 16 to the cavity between molded composite foam 10 retained in female mold 14 and male mold 15. The mold was closed by a press at a molding surface pressure of 50 kg/cm$^2$, thereby completing the molding of thermoplastic resin 18. Thus, multilayer molded article 19 in which top layer 10 (molded composite foam) and thermoplastic resin 18 were integrated was obtained as shown in FIG. 10.

The sectional view of the multilayer molded article obtained is shown in FIG. 11. This article had a thickness of the non-foam layer of 0.7 mm, a thickness of the foam layer of 4 mm, and a thickness of the thermoplastic resin layer of 2.3 mm, exhibited an impact resilience of 20% or more, and had the emboss pattern which had been transferred, exhibiting satisfactory appearance.

LEGENDS

Figure 1:
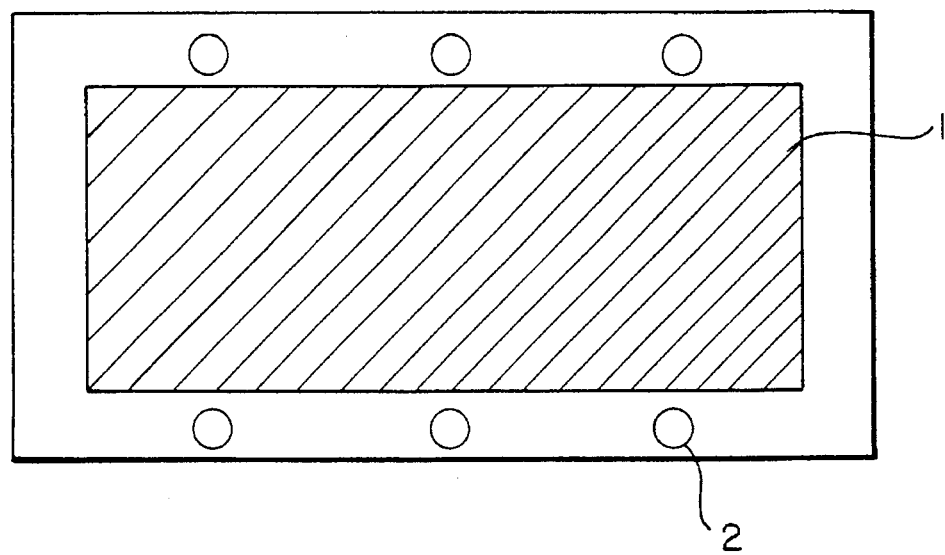
FIG. 1 shows a planar view of a powder feeding box.
Figure 2:
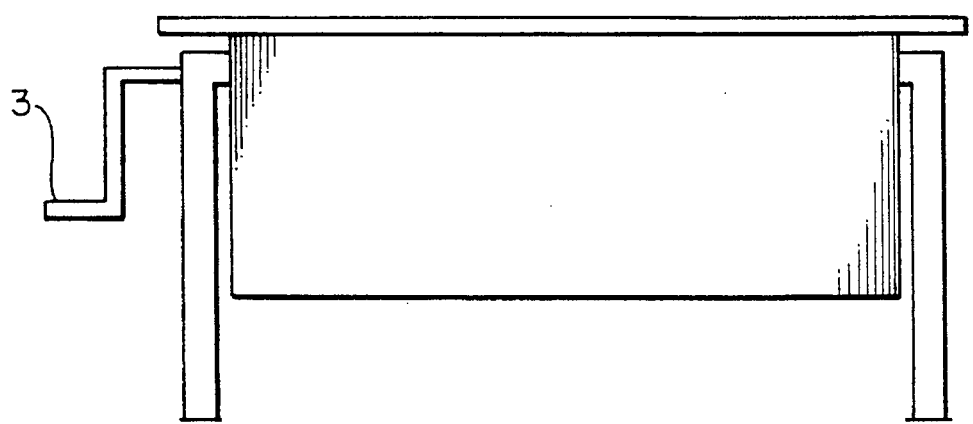
FIG. 2 shows a frontal view of a powder feeding box.
Figure 3:
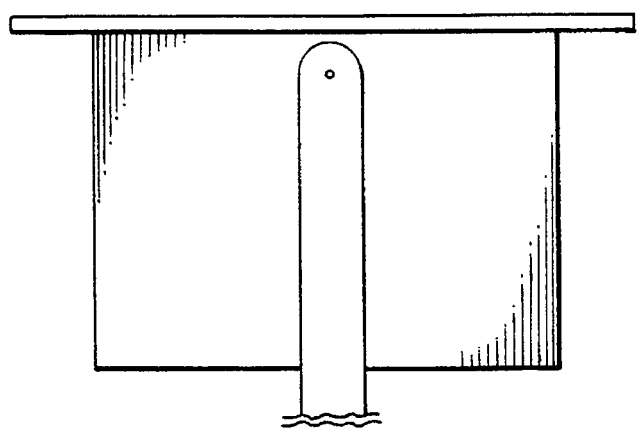
FIG. 3 shows a lateral view of a powder feeding box.
Figure 4:
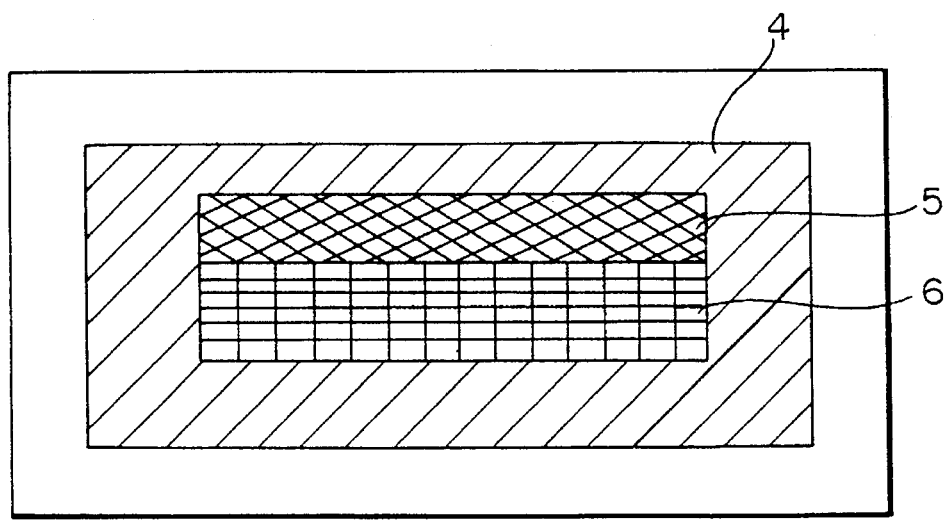
FIG. 4 shows a planar view of a mold.
Figure 5:
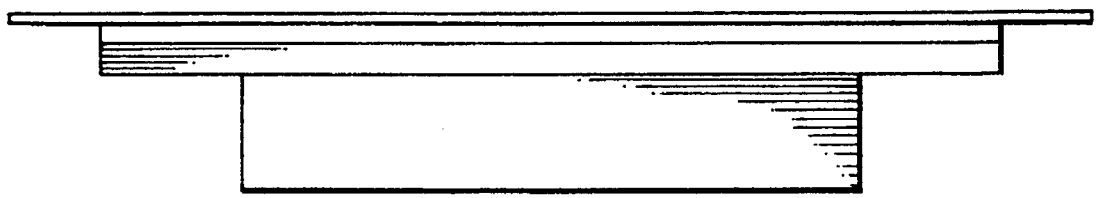
FIG. 5 shows a frontal view of a mold.
Figure 6:
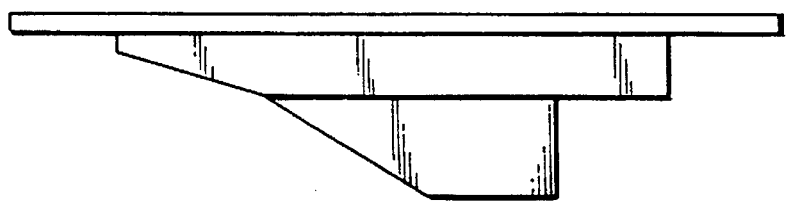
FIG. 6 shows a lateral view of a mold.
Figure 7:
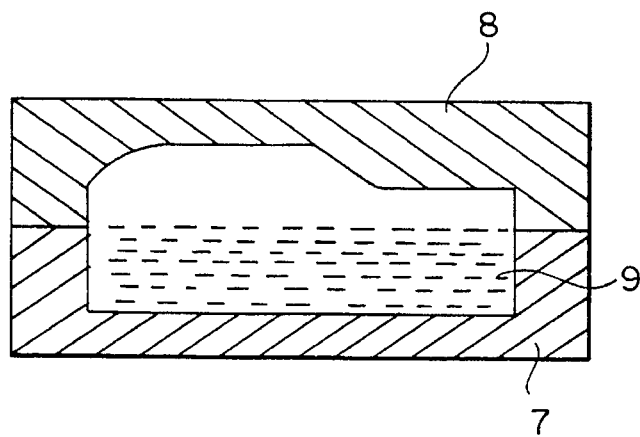
FIG. 7 shows a sectional view of a mold for a powder molding together with a vessel containing a resin composition for the powder molding.
Figure 8:
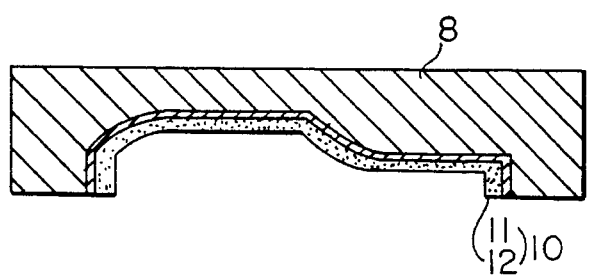
FIG. 8 shows a sectional view of a mold for a powder molding which retains a molded composite foam (top layer).
Figure 9:
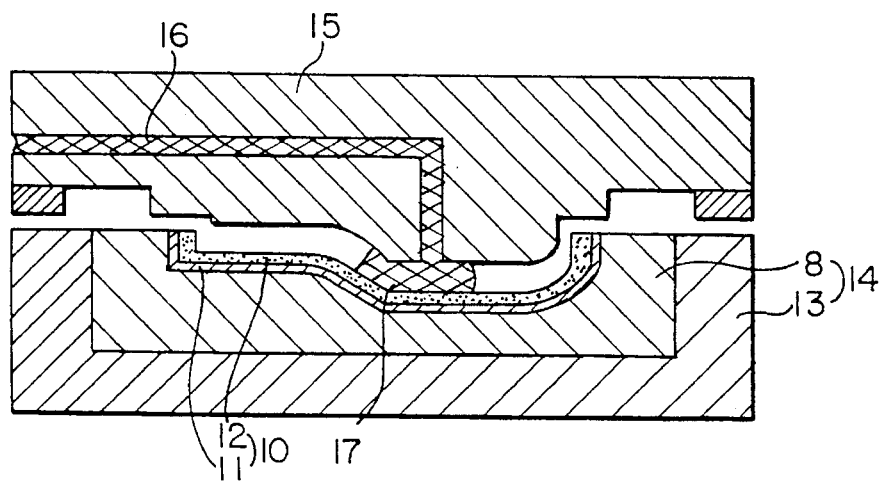
FIG. 9 shows a sectional view indicating that a thermoplastic resin is fed from a male mold for thermoplastic resin molding to a mold for a powder molding which retains a molded composite foam (top layer) and is integrated with a mold base.
Figure 10:
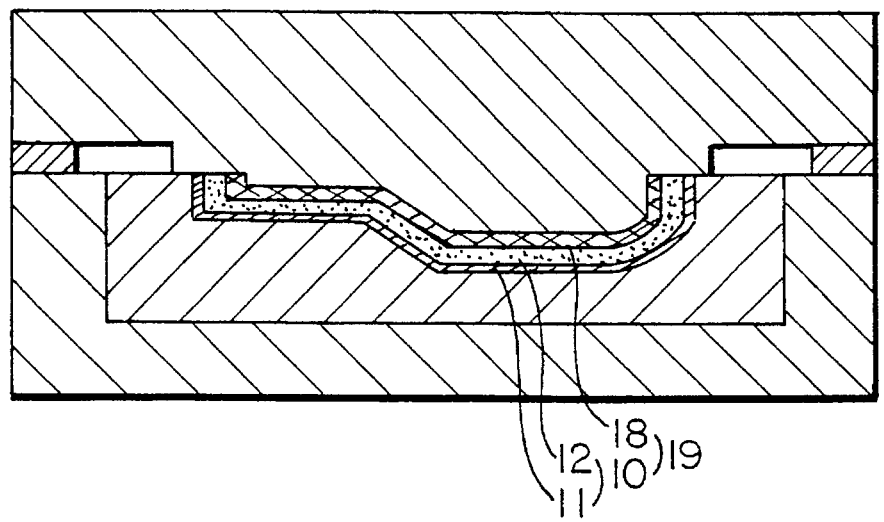
FIG. 10 is a sectional view indicating a male mold and a female mold for a thermoplastic resin molding which are closed.
Figure 11:
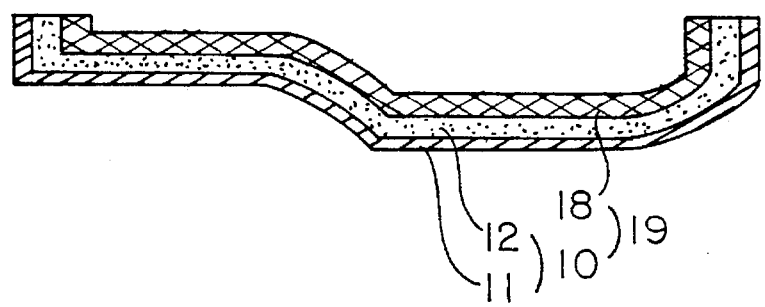
FIG. 11 shows a sectional view of a multilayer molded article consisting of a molded composite foam (top layer) and a thermoplastic resin layer.

1: Opening
2: Clip
3: Single screw rotating device
4: Opening
5: Rope twist pattern in mold
6: Leather grain pattern in mold
7: Vessel
8: Mold for powder molding
9: Resin composition for powder molding
10: Molded composite foam (top layer)
11: Non-foam layer
12: Foam layer
13: Mold base
14: Female mold for thermoplastic resin molding
15: Male mold for thermoplastic resin molding
16: Passage for feeding thermoplastic resin
17: Molten thermoplastic resin
18: Thermoplastic resin layer
19: Multilayer molded article

What is claimed is:

1. A multilayer molded article, comprising a composite foam layer and a thermoplastic resin layer, wherein said composite foam layer is a composite foam layer comprising a foam layer obtained from the powder of a polyethylenic foaming composition (A) and a non-foam layer obtained from the powder of a composition containing a thermoplastic elastomer (B), wherein (A) is a polyethylenic foaming composition powder comprising (a) 100 parts by weight of an ethylenic copolymer having glycidyl groups consisting of 20 to 99.9% by weight of ethylene units, 0.1 to 30% by weight of a unit of a glycidyl ester of an unsaturated carboxylic acid or an unsaturated glycidyl ether, and 0 to 50% by weight of ethylenically unsaturated ester units other than a glycidyl ester, (b) 0.1 to 30 parts by weight of a carboxylic acid having 2 or more carboxyl groups and a molecular weight of 1500 or less, and (c) 0.1 to 20 parts by weight of a foaming agent of a thermal decomposition type, and wherein (B) is a thermoplastic elastomer having a complex dynamic viscosity η* (1) of $1.5 \times 10^5$ poise or less and a Newtonian viscosity index n of 0.67 or less, which is a composition comprising an ethylene/α-olefinic copolymeric rubber and a polyolefinic resin, or a partially-crosslinked composition comprising an ethylene/α-olefinic copolymeric rubber and a polyolefinic resin.

2. A method of preparing a multilayer molded article comprising a composite foam layer and a thermoplastic resin layer, comprising lining a foam layer obtained from the powder of a polyethylenic foaming composition (A) to a non-foam layer obtained from the powder of a composition containing a thermoplastic elastomer (B) to form said composite foam layer by the powder molding method followed by retaining said composite foam layer in one of the male/female molds while supplying a molten thermoplastic resin between said composite foam and the other mold and pressing the molds to each other to integrate said composite foam layer and said thermoplastic resin, wherein (A) is a polyethylenic foaming composition powder comprising (a) 100 parts by weight of an ethylenic copolymer having glycidyl groups consisting of 20 to 99.9% by weight of ethylene units, 0.1 to 30% by weight of a unit of a glycidyl ester of an unsaturated carboxylic acid or an unsaturated glycidyl ether, and 0 to 50% by weight of an ethylenically unsaturated ester unit other than a glycidyl ester, (b) 0.1 to 30 parts by weight of a carboxylic acid having 2 or more carboxyl groups and a molecular weight of 1500 or less, and (c) 0.1 to 20 parts by weight of a foaming agent of a thermal decomposition type, and wherein (B) is a thermoplastic elastomer having a complex dynamic viscosity η* (1) of $1.5 \times 10^5$ poise or less and a Newtonian viscosity index n of 0.617 or less, which is a composition comprising an ethylene/α-olefinic copolymeric rubber and a polyolefinic resin, or a partially-crosslinked composition comprising an ethylene/α-olefinic copolymeric rubber and a polyolefinic resin.

3. A multilayer molded article comprising a composite foam layer and a thermosetting resin layer, wherein said composite foam layer is a composite foam layer comprising a foam layer obtained from the powder of a polyethylenic foaming composition (A) and a non-foam layer obtained from the powder of a composition containing a thermoplastic elastomer (B), wherein (A) is a polyethylenic foaming composition powder comprising (a) 100 parts by weight of an ethylenic copolymer having glycidyl groups consisting of 20 to 99.9% by weight of ethylene units, 0.1 to 30% by weight of a unit of a glycidyl ester of an unsaturated carboxylic acid or an unsaturated glycidyl ether, and 0 to 50% by weight of an ethylenically unsaturated ester unit other than a glycidyl ester, (b) 0.1 to 30 parts by weight of a carboxylic acid having 2 or more carboxyl groups and a molecular weight of 1500 or less, and (c) 0.1 to 20 parts by weight of a foaming agent of a thermal decomposition type, and wherein (B) is a thermoplastic elastomer having a complex dynamic viscosity η* (1) of $1.5 \times 10^5$ poise or less and a Newtonian viscosity index n of 0.67 or less, which is a composition comprising an ethylene/α-olefinic copolymeric rubber and a polyolefinic resin, or a partially-crosslinked composition comprising an ethylene/α-olefinic copolymeric rubber and a polyolefinic resin.

4. A method of preparing a multilayer molded article comprising a composite foam layer and a thermosetting resin layer, comprising lining a foam layer obtained from the powder of a polyethylenic foaming composition (A) to a non-foam layer obtained from the powder of a composition containing a thermoplastic elastomer (B) to form said composite foam layer, by the powder molding method followed by retaining said composite foam layer in one of the male/female molds while supplying a molten thermoplastic resin between said composite foam and the other mold and pressing the molds to each other to integrate said composite foam layer and said thermoplastic resin, wherein (A) is a polyethylenic foaming composition powder comprising (a) 100 parts by weight of an ethylenic copolymer having glycidyl groups consisting of 20 to 99.9% by weight of ethylene units, 0.1 to 30% by weight of a unit of a glycidyl ester of an unsaturated carboxylic acid or an unsaturated glycidyl ether, and 0 to 50% by weight of an ethylenically unsaturated ester unit other than a glycidyl ester, (b) 0.1 to 30 parts by weight of a carboxylic acid having 2 or more carboxyl groups and a molecular weight of 1500 or less, and (c) 0.1 to 20 parts by weight of a foaming agent of a thermal decomposition type, and wherein (B) is a thermoplastic elastomer having a complex dynamic viscosity η* (1) of $1.5 \times 10^5$ poise or less and a Newtonian viscosity index n of 0.67 or less, which is a composition comprising an ethylene/α-olefinic copolymeric rubber and a polyolefinic resin, or a partially-crosslinked composition comprising an ethylene/α-olefinic copolymeric rubber and a polyolefinic resin.

* * * * *